(12) United States Patent
Abrams

(10) Patent No.: US 8,463,771 B2
(45) Date of Patent: Jun. 11, 2013

(54) METHOD AND APPARATUS FOR SELECTING STEEL GRADES

(75) Inventor: Jurgen Abrams, Osnabruck (DE)

(73) Assignee: Abrams Engineering Services GmbH & Co. KG, Osnabruck (DE)

( * ) Notice: Subject to any disclaimer, the term of this patent is extended or adjusted under 35 U.S.C. 154(b) by 16 days.

(21) Appl. No.: 13/180,046

(22) Filed: Jul. 11, 2011

(65) Prior Publication Data

US 2012/0117106 A1    May 10, 2012

(51) Int. Cl.
*G06F 7/00* (2006.01)

(52) U.S. Cl.
USPC ............ 707/722; 707/758; 715/212; 715/273

(58) Field of Classification Search
USPC ........................... 707/722, 758; 715/212, 273
See application file for complete search history.

(56) References Cited

U.S. PATENT DOCUMENTS

| | | | |
|---|---|---|---|
| 6,460,059 B1 * | 10/2002 | Wisniewski .................. 715/212 |
| 6,789,252 B1 * | 9/2004 | Burke et al. .................. 717/100 |
| 7,730,054 B1 * | 6/2010 | Marmaros et al. ............ 707/713 |
| 7,747,611 B1 * | 6/2010 | Milic-Frayling et al. ..... 707/722 |
| 2003/0014223 A1 * | 1/2003 | Phillips et al. .................. 703/1 |

OTHER PUBLICATIONS

Qiang, et al., Trans. NonFerrous Met. Soc. China 16(2006) s572-s576.*
Yujun et al., 2010 Third International Conference on Intelligent Networks and Itelligent Systems, pp. 498-501.*

* cited by examiner

*Primary Examiner* — Cheyne Ly
(74) *Attorney, Agent, or Firm* — Laurence P. Colton; Smith Risley Tempel Santos LLC

(57) ABSTRACT

A method and an apparatus for selecting at least one steel grade from a stock of data, stored in a memory, for a population of a plurality of steel grades using a data processing device, wherein the method has the following steps: (a) a selection device (11) which can be operated by a user is displayed on a display means (12) which can be used to set values for at least two steel grade features which respectively denote the steel grades; (b) the stock of data is queried for a steel grade for which the stock of data stores values for steel grade features which correspond to the set values of the steel grade features or which fulfill conditions which are dependent on the set values, and (c) if said query is satisfied by a steel grade and possibly in so far as said steel grade fulfills one or more further conditions, said steel grade or information representing it is displayed on the display means (12).

12 Claims, 3 Drawing Sheets

Fig. 1
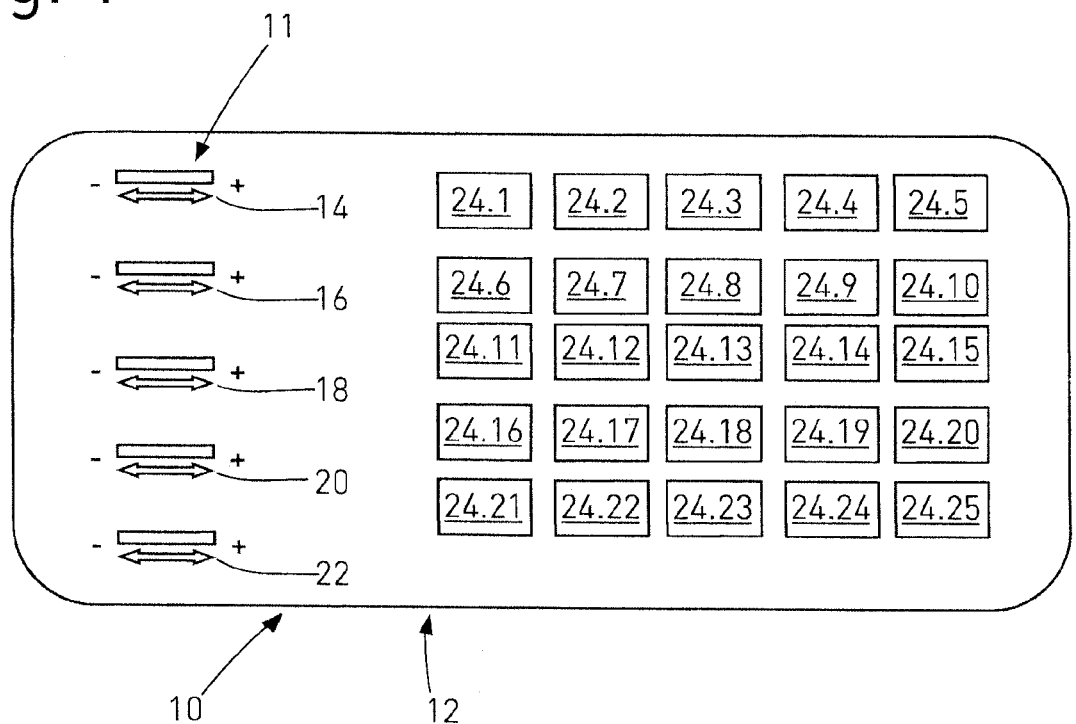
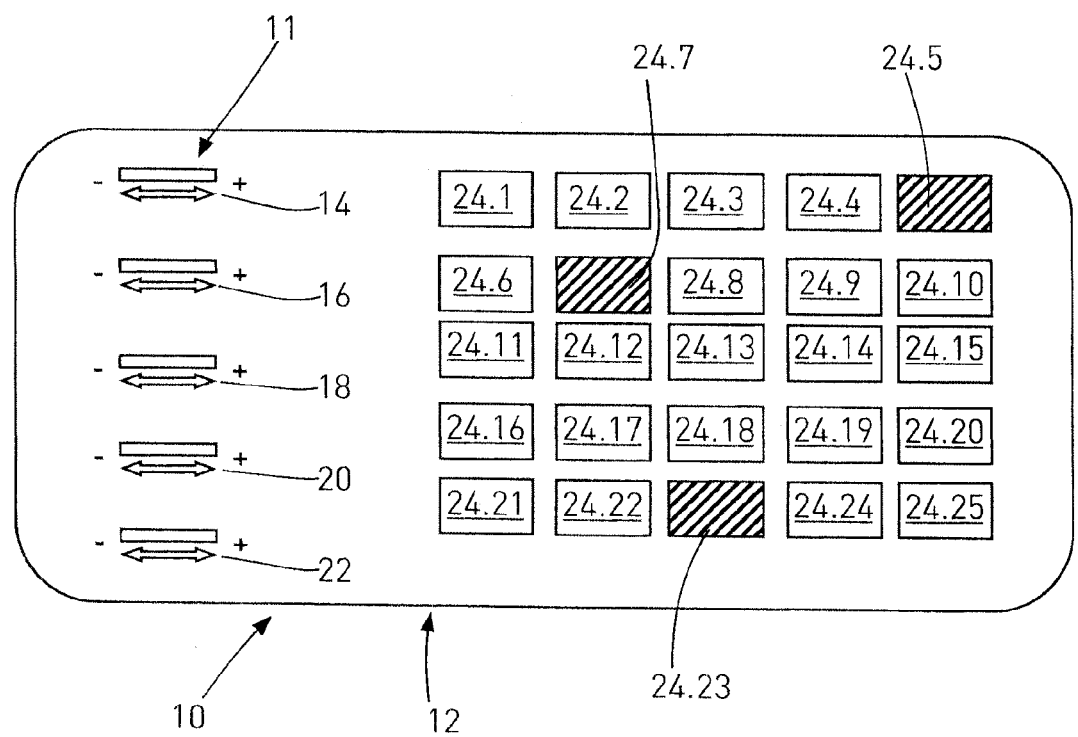
Fig. 2

METHOD AND APPARATUS FOR SELECTING STEEL GRADES

BACKGROUND OF THE INVENTION

1. Technical Field

The present invention relates to a method for selecting at least one steel grade from a stock of data, stored in a memory, for a population of a plurality of steel grades using a data processing device. Furthermore, the invention relates to a program product for carrying out the method and to a data processing device having a memory which stores such a program product.

2. Prior Art

There are a large number of different steel grades. The individual steel grades are characterized or denoted by various features, such as machinability, delivery temper, steel grade designation and many more features. For users of steel, particularly companies, it is often extremely difficult to determine the steel grade best suited to the respective purpose quickly and without error.

Often, the user's specific purpose means that it is important to him for the steel grade to have at least two or three core properties or core features. By way of example, these may be a particular tensile strength value, a particular machinability classification or an achievable working temper. In this context, the particular values do not usually need to be achieved exactly by the respective steel grade, but rather it suffices if the actual values of the core features respectively vary within prescribed value ranges, exceed requisite minimum values or are below maximum permissible values. Steel manufacturers and suppliers usually provide information relating to steels only one-dimensionally, however, but not in an arbitrarily combinable fashion or with extended multi-dimensionality. By way of example, although a steel grade with a tensile strength value which the user requires can be identified very quickly, the identified steel grade may then not meet the requirements in respect of the further core features, such as machineability. This is because the machinability value for the respective steel grade is not queried until the steel grade corresponding to the desired tensile strength value has already been identified or preselected. The greater the number of core features which the user respectively requires to have desired values, the more difficult and laborious it is to identify a suitable steel grade or to select one from amongst the possible steel grades.

BRIEF SUMMARY OF THE INVENTION

Against this background, it is an object of the present invention to specify a method of the type cited at the outset which allows at least one steel grade required by the user to be identified from a population of steel grades as quickly, easily and reliably as possible. Furthermore, it is an object of the present invention to specify an appropriate program product for carrying out the method and a data processing device on which the program product can be executed.

This object is achieved by a method for selecting at least one steel grade from a stock of data, stored in a memory, for a population of a plurality of steel grades using a data processing device, having the following steps:

a) a selection device (11) which can be operated by a user is displayed on a display means (12) which can be used to set values for at least two steel grade features which respectively denote the steel grades, b) the stock of data is queried for a steel grade for which the stock of data stores values for steel grade features which correspond to the set values of the steel grade features or which fulfil conditions which are dependent on the set values, and c) if said query is satisfied by a steel grade and possibly in so far as said steel grade fulfils one or more further conditions, said steel grade or information representing it is displayed on the display means (12);

by a program product for carrying out the above method when it is executed on a programmed data processing device, particularly a PC, a client/server system, a mobile telephone, a laptop or the like; and by a data processing device having a program product as above that is stored in a memory associated with the data processing device.

Accordingly, the invention specifies a method for selecting at least one steel grade from a stock of data, stored in a memory, for a population of a plurality of steel grades using a data processing device. In this case, a display means, preferably a screen, is used to display a selection device which can be operated by a user of the method. The selection device can be used by the user to set values for at least two steel grade features respectively denoting the steel grades. Next, the stock of data is automatically queried for a steel grade for which the stock of data stores steel grade feature values which correspond to the set values for the steel grade features or which fulfil the conditions or criteria which are dependent on the set values. If this query condition is fulfilled by a steel grade and possibly in so far as said steel grade fulfils one or more further conditions, this steel grade is displayed on the display means or information representing the steel grade is displayed. Representative information of this kind may be graphical elements, numeric and/or alphanumeric steel grade designations or the like.

As far as the settable and queriable steel grade features are concerned, these may be material properties of the steels, material compositions, treatments to which the steels have been subjected, and the like. By way of example, it is also conceivable for the explicit designation or identifier for a respective steel grade to be provided as a settable or queriable steel grade feature. In that case, it would be possible to use the determined algorithms or conditions to query steel grades which, by way of example, are similar to this set steel grade identifier, for example as material alternatives.

The invention provides that, overall, the data processing device uses predetermined criteria or conditions, following the setting of the relevant values for the steel grade features within the stock of data or within the database, to automatically perform a comparison between the values which have been set for the respective steel grade features and the relevant steel grade feature values which are respectively stored for the steel grades in the database. If the result of this comparison is that the stored values of the steel grade features of a steel grade satisfy the predetermined criteria, and possibly in so far as they fulfil one or more further conditions, the relevant steel grade is selected from the database and displayed on the display means.

An example of a condition which is dependent on the respectively set values of the steel grade features and which must satisfy the stored value for the respective steel grade feature may be that the stored value needs to be situated in a particular range around the set value of the steel grade feature, for example.

However, the fulfilment of such a predetermined condition may not be sufficient for the selection and display of the steel grade. This is because provision may naturally be made for the respective steel grade or the stored values of the steel grade features associated with the steel grade to have to fulfil yet further conditions which are not directly related to the set values of the steel grade features in order to be displayed. By way of example, it is at least theoretically conceivable for only certain steel grades to be at all selectable from the population of steel grades, depending on the user of the method.

The data processing device on which such a method according to the invention can be executed may be any kind of apparatus which has at least a suitable processor for executing the individual method steps. By way of example, the data processing device may accordingly be a PC, a mobile telephone, a laptop, a tablet PC or any other kind of computer. The display means in this context is usually a screen as part of such a data processing device or at least connected thereto. Naturally, the method may also be implemented in a suitable computer network, for example within the context of a client/server system. The method can accordingly be implemented particularly on the Internet. By way of example, it is thus possible for the selection device and/or the selected steel grade to be presented in a suitable Internet client, particularly a browser. The database, the database queries or the entire sequence of the method according to the invention, or at least a portion thereof, could in this case be executed on an appropriate, remotely arranged web or application server or implemented thereon by means of software.

In this context, the method according to the invention is implemented as a (computer) program product, that is to say as a piece of software, which can be executed by such a data processing device. Usually, the program product is then stored in a memory which is associated with the data processing device, possibly even arranged remotely therefrom.

The selection device for setting the values of the steel grade features is preferably part of a graphical user interface which is displayed on the display means. It can be controlled by the user, for example using a suitable input interface of the data processing device. As the input appliance, the input interface may have an ordinary touch screen connected to it, for example, which in this case is simultaneously used as a display means. Particular input-active fields on the touch screen can then be used by the user to operate the selection device.

It is naturally also possible for other input appliances to be connected to the input interface, for example a keyboard, a computer mouse or the like.

The selection device preferably has a plurality of operatable display means. These display means are preferably visually separate from one another on the display means or on the user interface displayed on the display means. They may each be in the form of a kind of controller, for example.

In one particularly preferred embodiment of the invention, the population of steel grades which can be selected in principle on the basis of the set values of the steel grade features is also displayed in part or fully on the display means. In this case, as already indicated above, the steel grades may be presented as graphical symbols and/or numerically and/or alphanumerically or in another way. Thus, the individual steel grades may have respective associated frame-like graphical elements, for example, which each contain a designation identifying the respective steel grade. The individual graphical elements together with the designation are preferably displayed in a grid, so that a user has a good visual grasp of the individual graphical elements or steel grades from the population of steel grades.

Should a steel grade satisfy the above query, i.e. be selected as suitable by the data processing device on the basis of the set values of the steel grade features, it is preferably highlighted against the displayed unselected steel grades from the population, so that this steel grade can be identified by the user as having been selected or as satisfying the query.

If, in other words, the user uses the selection device to prescribe values for individual steel grade features, for example tensile strength and machinability, then the steel grades matching these values are first of all selected from the population or the database and then highlighted within the population which is presented on the display means or the user interface. In this case, the highlighting is preferably visual, for example by virtue of the graphical elements which represent the individual steel grades being colored.

With particular preference, after a or any change of values for the steel grade features, the above-defined steel grade query is performed again by operating the selection device using the then updated values, and a steel grade which satisfies the query, and possibly fulfils the further conditions described above, is displayed, possibly again, on the display means. In other words, the user can prescribe or set the individual values of the steel grade features more or less interactively, whereupon immediately afterwards the relevant steel grade, in so far as a steel grade actually fulfils the query conditions, is selected and displayed. Accordingly, the display of the steel grade which possibly satisfies the query is respectively updated as soon as the user changes the values of the steel grade features or as soon as this change has been brought about using the selection device.

Expediently, the (at least) one steel grade possibly selected using the updated values of the steel grade features is also highlighted in the population in this case, wherein the steel grade highlighted against the rest of the steel grades before the values are updated is not highlighted on the display means (again) in so far as it is not selected from the stock of data (again) following the value update. It is then no longer recognizable as having been selected. In this case, the visual highlighting of this previously selected steel grade is no longer maintained, or reset.

In a further particularly important embodiment of the invention, the selection device for setting the values of the steel grade features is at least intermittently displayed together with the population of the steel grades on the display means, particularly on the common user interface. This achieves a particularly high level of controllability and clarity for the method according to the invention. The user sees at a glance both the steel grade features which he can set and the results which give rise to the set features.

Preferably, the population is displayed together with the selection device at least during the time in which the selection device is operated in order to set the steel grade features. It appears appropriate to display both the selection device and the population essentially constantly together or simultaneously during the use of the method according to the invention.

In a further embodiment of the invention, the steel grades from the population which are displayed on the display means can be selected individually and directly by a user, particularly using the input appliance, even without operating the selection device, for example by virtue of the user touching a touch screen at a position at which the steel grade to be selected is shown. The steel grade directly selected in this manner can expediently be visually highlighted against the unselected steel grades following the selection.

Following the selection of a steel grade in this manner, the steel grade feature values stored for the selected steel grade are then queried from the stock of data and are transferred to the selection device as output values. In other words, these values are accepted in the selection device or transferred thereto, so that the selection device is (pre)set to these values.

By way of example, provision may be made for a user to directly select from the displayed steel grades in the population, even before the selection device is first operated, a steel grade which he already knows or which he finds at least approximately suitable for his purpose. Following such a selection, the values of the steel grade features stored for the selected steel grade are automatically transferred to the selection device as output values. Next, the user can change the value of a particular steel grade feature, given otherwise unchanged output values, starting from these (pre)set output values, for example, by operating the selection device in order to specifically determine steel grades which are similar to the steel grade directly selected by the user. It is naturally also possible for a plurality of steel grade feature values to be changed.

Such direct selection of a steel grade from the population by a user with subsequent transfer of the steel grade feature values which are stored for the steel grade to the selection device can alternatively naturally also be made following operation of the selection device by the user for the first time. In this case, the current values which are set in the selection device as a result of the prior operation thereof would be overwritten by the aforementioned output values.

BRIEF DESCRIPTION OF THE DRAWINGS

Further features of the invention can be found in the appended claims, the description of a preferred exemplary embodiment which follows and in the appended drawings, in which:

FIG. 1 shows a user interface as part of an implementation of the method according to the invention for selecting steel grades in a first method state.

FIG. 2 shows the user interface from FIG. 1 in a second method state.

DETAILED DESCRIPTION OF PREFERRED EMBODIMENTS

FIGS. 1 and 2 show a user interface 10 which is displayed on a display means, in the present case a touch screen 12. The touch screen 12 and the user interface 10 are part of a data processing device which has been set up according to the invention and which is otherwise not shown further.

Figure 3:
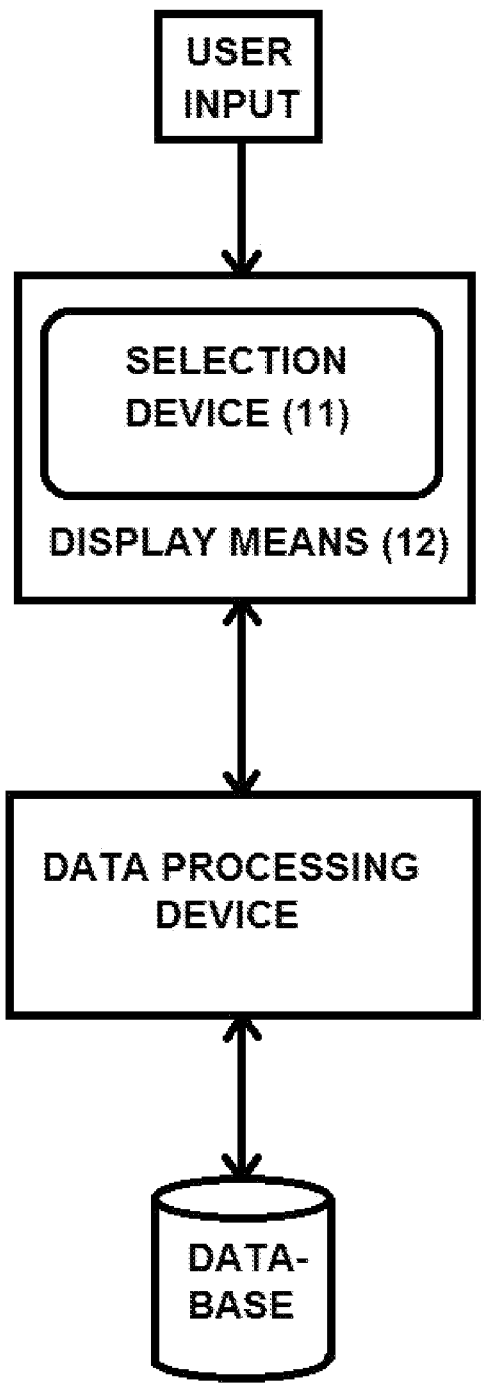
FIG. 3 shows a schematic flowchart of a representative system for implementation of the method according to the invention.

FIG. 3 shows a schematic flowchart of a representative system for implementation of the method according to the invention in which the user interacts with the selection device 11 on the touch screen display means 12. A user can use the data processing device to prescribe the values of various features of steel grades. Depending on the set values, the data processing device selects one or more steel grades, in so far as it is possible. The respective steel grade is selected from a population or set or multiplicity of steel grades which is stored in a database, not shown. In this case, only that steel grade (possibly a plurality of steel grades) is respectively selected which corresponds to the values prescribed or set by the user or which, in general terms, fulfils conditions which are dependent on these values. Next, this steel grade or information denoting this steel grade is displayed on the display means 12.

Both the user interface 10 and the method described in more detail below for selecting and displaying particular steel grades are implemented in a suitable fashion by an appropriate program in the data processing device or are executed on the latter.

To this end, the data processing device has at least one processor which can execute the relevant method sequences implemented by means of programming. In addition, the data processing device has an associated memory which stores the program that is to be executed. Usually, the data processing device has a fixed memory and additionally what is known as a main memory.

In the present case, the data processing device is in the form of what is known as a tablet PC.

The input appliance used by the tablet PC for the input or setting of data is the touch screen 12. For this purpose, the user interface 10 shown on the touch screen 12 in FIGS. 1 and 2 has a selection device 11 which can be operated by a user by suitably touching the touch screen 12. The selection device 11 can be used to set values of particular prescribed features which describe or characterize some or all steel grades from the population.

For this purpose, the selection device 11 has, in the present case, five selection means 14, 16, 18, 20, 22. These selection means 14, 16, 18, 20, 22 are controller-like operator control elements which a user can operate by suitably touching the touch screen 12.

Each selection means 14, 16, 18, 20, 22 has a respective associated steel grade feature. By way of example, the controller 14 has the associated feature machinability which the desired steel grade is intended to have. The controller 16 has the associated feature of tensile strength of the steel grade, the controller 18 has the associated feature of working temper, the controller 20 has the associated feature of wear resistance and the controller 22 has the associated feature of toughness.

It is naturally within the scope of the invention to provide another type and/or number of selection devices or other types of selection means and/or to associate other steel grade features with the selection means.

The user can use the controllers 14, 16, 18, 20, 22 to set the values of the steel grade feature respectively associated with them. By operating the "+" symbol on the controller 14, a user can increase the value of the machinability, for example, which the desired steel grade is intended to have. If the "−" were operated, the value of the desired machinability would be decreased. Similarly, the values of the steel grade features associated with the individual controllers 16, 18, 20, 22 can be changed or adjusted.

Individual frame-like graphical elements 24.1-24.25 are arranged on the user interface 10 in a grid to the right of the selection device 11 or next to the controllers 14-22. Each graphical element 24.1-24.25 has respectively been explicitly assigned precisely one steel grade from the population of steel grades. In other words, the set (25 graphical elements) of graphical elements 24.1-24.25 on the user interface 10 represents the population of steel grades.

Each steel grade is individually identifiable by means of an appropriate designation, not shown in FIGS. 1 and 2, which is respectively written in the centre of the respective graphical element 24.1-24.25. The type of steel grade designation used is unimportant within the context of the invention. It is possible to use standard designations for the steel grades, or else descriptive short names, number combinations or the like.

The individual steel grades are stored in a memory, namely in a database of the data processing device or of the tablet PC. An appropriate table stores respective values of the steel grade features characterizing the steel grade for each steel grade or for an identifier or designation which identifies the steel grade. In the present case, the table stores for each steel grade values of those steel grade features which can be set using the selection device 11 or the controllers 14, 16, 18, 20, 22. In other words, the table stores for each steel grade a respective value relating to machinability, relating to tensile strength, relating to working temper, relating to wear resistance and relating to toughness.

The type of visualization of the steel grades is naturally unimportant. It would also be possible to use completely different, i.e. visually differing, graphical elements from the frame-like graphical elements 24.1-24.25 shown. It is also conceivable to dispense with the graphical elements 24.1-24.25 entirely and to use or show exclusively the designations of the respective steel grades. As a person skilled in the prior art can see, there are many options for graphical representation conceivable in this case.

Figure 4:
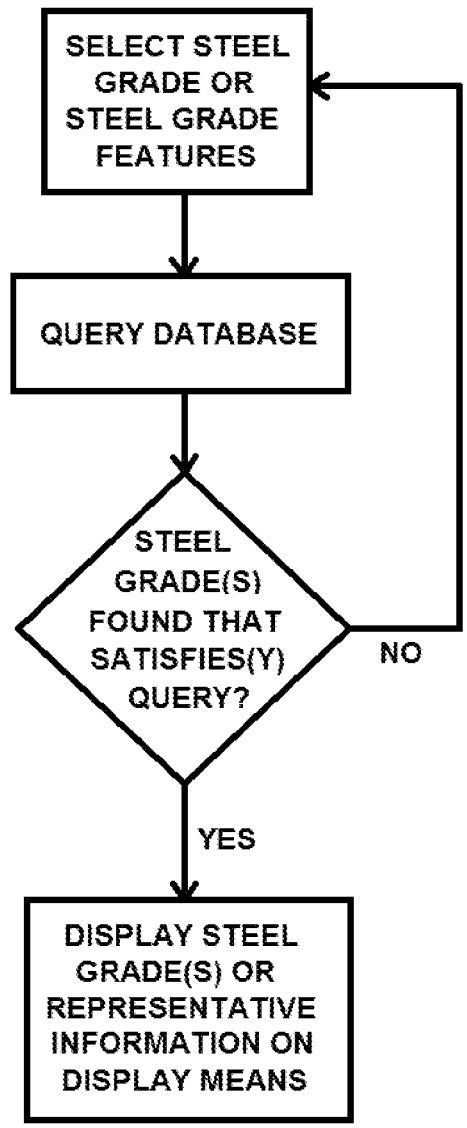
FIG. 4 shows a flow chart of a representative implementation of the method according to the invention.

FIG. 4 shows a flow chart of a representative implementation of the method according to the invention, for example, a software program implementation. In the present case, the method according to the invention is executed as follows:

Every time one of the controllers 14, 16, 18, 20, 22 is operated, the data processing device starts a query in the database. The query uses the valid or current feature values to ascertain whether a steel grade from the database corresponds to the set feature values or, in general terms, predetermined conditions derived therefrom. Depending on the set values, each steel grade which corresponds to the preset feature values or, in accordance with a suitable algorithm, comes closest thereto is accordingly selected from the database.

Thus, in the simplest case, a query is placed to determine whether steel grade feature values which correspond to the values currently set using the controllers 14, 16, 18, 20, 22 are stored for one or more steel grades in the database.

In accordance with a more complex query, it is possible, by way of example, for a check to be performed to determine whether values of a particular steel grade feature which are respectively situated in a range which is defined by the corresponding value that is set on the respective controller 14, 16, 18, 20, 22 and a particular deviation from said value, for example 10%, are stored for one or more steel grades in the database.

As a person skilled in the prior art can see, there are a wide variety of options for the nature of the queries.

FIG. 2 shows a method state in which the set values of the steel grade features have resulted in the data processing device having selected three steel grades from the database as matching the values. Following selection of the three steel grades, the graphical elements 24.5, 24.7, 24.23 representing said steel grades are visually highlighted in a particular manner against the unselected steel grades within the population of steel grades which is symbolized by the graphical elements 24.1-24.25. This highlighting is shown in FIG. 2 by means of the graphical elements 24.5, 24.7, 24.23 being shaded.

The nature of the visual highlighting of the selected steel grades is naturally unimportant. What is crucial is that a user can recognize the highlighting in comparison with the unselected steel grades.

In the present exemplary embodiment, any change in a value of a steel grade feature triggers the aforementioned method sequence. Should the next change in one or more values of the steel grade features prompt the selection of other steel grades from the database as matching the set values, then these other steel grades, or the graphical elements 24.1-24.25 representing them, are highlighted. The previously highlighted graphical elements 24.5, 24.7, 24.23 are matched visually to the unhighlighted graphical elements again.

In addition, provision is made for more detailed information to be called for the individual steel grades or the individual graphical elements at the request of the user. Thus, when the touch screen 12 is touched at the individual positions of the graphical elements 24.1-24.25, respective detailed information relating to the steel grade associated with the respective graphical element 24.1-24.25 is displayed, such as all the available values for the steel grade features or the like. By way of example, this detailed information can appear on a separate section or window of the screen surface.

Finally, provision is made for a user to be able to select a steel grade or a graphical element from the steel grades or graphical elements 24.1-24.25 directly, namely by bypassing the selection device 11. The selection is made by suitably touching the touch screen 12 at the respective positions at which the graphical elements 24.1-24.25 are displayed. Following such selection of one of the graphical elements 24.1-24.25, the steel grade feature values stored in the database for the relevant, directly selected steel grade are automatically transferred to the selection device 11 as output values. In this case, the controllers 14, 16, 18, 20, 22 are set to the values called from the database.

If, by way of example, a user selects the graphical element 24.10 directly, the controllers 14, 16, 18, 20, 22 are automatically preset to the values stored for the steel grades 24.10 associated with the graphical element 24.10 which relate to machinability, to tensile strength, to working temper, to wear resistance and to toughness.

By way of example, this allows a user to first of all select a steel grade which he already knows from the presented population directly. On the basis of the values stored for the directly selected steel grade, it is possible to determine steel grade alternatives which, although they differ from the directly selected steel grade in terms of a particular value of a steel grade feature, are the same in terms of other steel grade feature values. Thus, it is then possible, for example by operating only the controller 16 for tensile strength, to determine a steel grade alternative to the steel grade which corresponds to the graphical element 24.10, the tensile strength values of which have different values, which are better particularly in respect of the required purpose, from the steel grade which corresponds to the graphical element 24.10.

In this context, it is naturally possible to take the output values as a basis for also operating two or more controllers 14, 16, 18, 20, 22 for the purpose of changing the output values or for changing the values of two or more steel grade features.

When the controllers 14, 16, 18, 20, 22 have been operated, the at least one steel grade, which then matches the altered controller values, would be ascertained and the graphical element 24.1-24.25 representing the ascertained steel grade would be highlighted, as already described further above.

LIST OF REFERENCE SYMBOLS

10 User interface
11 Selection device
12 Touch screen
14 Controller
16 Controller
18 Controller
20 Controller
22 Controller
24 Graphical element

What is claimed is:
1. A method for selecting at least one steel grade from a stock of data, stored in a non-transitory memory, for a popu- lation of a plurality of steel grades using a data processing device, having the following steps implemented by the data processing device:

a) displaying a selection device (11) which can be operated by a user on a display means (12) that can be used to set values for at least two steel grade features which respectively denote the steel grades;

b) displaying of the population of the plurality of steel grades at least in part on the display means (12), wherein the selection device (11) is at least intermittently displayed together with the population on the display means;

c) querying the stock of data for a steel grade for which the stock of data stores values for steel grade features which correspond to the set values of the steel grade features or which fulfill conditions which are dependent on the set values;

d) if the data processing device determines that said query is satisfied by at least one steel grade and in so far as said at least one steel grade fulfills at least one further condition, displaying said at least one steel grade or information representing said at least one steel grade on the display means (12);

e) highlighting the at least one steel grade satisfying the query against the displayed steel grades from the population which do not satisfy the query, and identifying at least one steel grade as satisfying the query; and f) after a change of values for the steel grade feature, performing the query again by operating the selection device (11) using the updated values and displaying on the display means (12) a steel grade that satisfies the query, and/or fulfills the at least one further condition, and highlighting the steel grade against the displayed steel grade from the population which does not satisfy the query, wherein the steel grade highlighted against the rest of the steel grades before the values are updated is not highlighted on the display means (12) again, so that the steel grade is no longer identified as having been selected, in so far as the steel grade no longer satisfies the query after the values of the steel grade features have been updated.

2. The method according to claim 1, further comprising using the data processing device to display the population together with the selection device at least during operation of the selection device (11) for setting the steel grade features.

3. The method according to claim 1, wherein the displayed steel grades are individually selected by a user, wherein, following the selection of a steel grade, the data processing device queries the steel grade feature values stored for the selected steel grade from the stock of data and transfers the steel grade feature values stored for the selected steel grade to the selection device (11) as output values, so that these output values are set on the selection device.

4. The method according to claim 1, wherein the selection device (11) has a plurality of selection means (14, 16, 18, 20, 22) that are visually separate from one another on the display means (12), wherein each selection means (14, 16, 18, 20, 22) has an associated steel grade feature.

5. A program product stored in a non-transitory memory of and executed by a programmed data processing device, wherein the program product implements a method for selecting at least one steel grade from a stock of data, stored in the non-transitory memory, for a population of a plurality of steel grades using the data processing device, the method having the following steps implemented by the program product in the programmed data processing device:

a) displaying a selection device (11) which can be operated by a user on a display means (12) that can be used to set values for at least two steel grade features which respectively denote the steel grades;

b) displaying the population of the plurality of steel grades at least in part on the display means (12), wherein the selection device (11) is at least intermittently displayed together with the population on the display means;

c) querying the stock of data for a steel grade for which the stock of data stores values for steel grade features which correspond to the set values of the steel grade features or which fulfill conditions which are dependent on the set values;

d) if said query is satisfied by at least one steel grade and in so far as said at least one steel grade fulfills at least one further condition, displaying said at least one steel grade or information representing said at least one steel grade on the display means (12);

e) highlighting the at least one steel grade satisfying the query against the displayed steel grades from the population which do not satisfy the query, and identifying at least one steel grade as satisfying the query; and f) after a change of values for the steel grade feature, performing the query again by operating the selection device (11) using the updated values and displaying on the display means (12) a steel grade that satisfies the query, and/or fulfills the at least one further condition, and highlighting the steel grade against the displayed steel grade from the population which does not satisfy the query, wherein the steel grade highlighted against the rest of the steel grades before the values are updated is not highlighted on the display means (12) again, so that the steel grade is no longer identified as having been selected, in so far as the steel grade no longer satisfies the query after the values of the steel grade features have been updated.

6. The program product according to claim 5, wherein the program product implemented by the programmed data processing device causes the population to be displayed together with the selection device at least during operation of the selection device (11) for setting the steel grade features.

7. The program product according to claim 5, wherein the displayed steel grades are individually selected by a user, wherein, following the selection of a steel grade, the steel grade feature values stored for the selected steel grade are queried by the program product implemented by the programmed data processing device from the stock of data and are transferred to the selection device (11) as output values, so that these output values are set on the selection device.

8. The program product according to claim 5, wherein the selection device (11) has a plurality of selection means (14, 16, 18, 20, 22) that are visually separate from one another on the display means (12), wherein each selection means (14, 16, 18, 20, 22) has an associated steel grade feature.

9. A data processing device having a program product that is stored in a non-transitory memory associated with the data processing device, wherein the program product is executed in a programmed data processing device, and wherein the program product implements a method for selecting at least one steel grade from a stock of data, stored in a the non-transitory memory, for a population of a plurality of steel grades using the data processing device, the method having the following steps:

a) displaying a selection device (11) which can be operated by a user on a display means (12) that can be used to set values for at least two steel grade features which respectively denote the steel grades;

b) displaying the population of steel grades at least in part on the display means (12), wherein the selection device (11) is at least intermittently displayed together with the population on the display means;

c) querying the stock of data for a steel grade for which the stock of data stores values for steel grade features which correspond to the set values of the steel grade features or which fulfill conditions which are dependent on the set values;

d) if said query is satisfied by at least one steel grade and in so far as said at least one steel grade fulfills at least one further condition, displaying said at least one steel grade or information representing said at least one steel grade on the display means (12);

e) highlighting the at least one steel grade satisfying the query against the displayed steel grades from the population which do not satisfy the query, and identifying at least one steel grade as satisfying the query; and f) after a change of values for the steel grade feature, performing the query again by operating the selection device (11) using the updated values and displaying on the display means (12) a steel grade that satisfies the query, and/or fulfills the at least one further condition, and highlighting the steel grade against the displayed steel grade from the population which does not satisfy the query, wherein the steel grade highlighted against the rest of the steel grades before the values are updated is not highlighted on the display means (12) again, so that the steel grade is no longer identified as having been selected, in so far as the steel grade no longer satisfies the query after the values of the steel grade features have been updated.

10. The data processing device according to claim 9, wherein the population is displayed together with the selection device at least during operation of the selection device (11) for setting the steel grade features.

11. The data processing device according to claim 9, wherein the displayed steel grades are individually selected by a user, wherein, following the selection of a steel grade, the steel grade feature values stored for the selected steel grade are queried from the stock of data and are transferred to the selection device (11) as output values, so that these output values are set on the selection device.

12. The data processing device according to claim 9, wherein the selection device (11) has a plurality of selection means (14, 16, 18, 20, 22) that are visually separate from one another on the display means (12), wherein each selection means (14, 16, 18, 20, 22) has an associated steel grade feature.

* * * * *

UNITED STATES PATENT AND TRADEMARK OFFICE
CERTIFICATE OF CORRECTION

| | | |
|---|---|---|
| PATENT NO. | : 8,463,771 B2 | Page 1 of 1 |
| APPLICATION NO. | : 13/180046 | |
| DATED | : June 11, 2013 | |
| INVENTOR(S) | : Jurgen Abrams | |

It is certified that error appears in the above-identified patent and that said Letters Patent is hereby corrected as shown below:

Title Page, in the bibliographic information between the Prior Publication Data section and the Int. Cl. section, insert the following Foreign Application Priority Data section and information:

--(30)    Foreign Application Priority Data

Nov. 8, 2010   (DE) ..................... 10 2010 050 488.2--

Signed and Sealed this
Tenth Day of December, 2013

Margaret A. Focarino
*Commissioner for Patents of the United States Patent and Trademark Office*